United States Patent
Swarnamanjunathan et al.

(10) Patent No.: US 11,909,522 B2
(45) Date of Patent: *Feb. 20, 2024

(54) SYSTEM AND METHOD TO MEASURE AND SCORE APPLICATION HEALTH VIA CORRECTABLE ERRORS

(71) Applicant: Cisco Technology, Inc., San Jose, CA (US)

(72) Inventors: Keerthi Manjunathan Swarnamanjunathan, Sunnyvale, CA (US); Chih-Tsung Huang, Burlingame, CA (US); Kelvin Chan, San Jose, CA (US); Wei-Jen Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,523

(22) Filed: Dec. 21, 2022

(65) Prior Publication Data

US 2023/0123918 A1  Apr. 20, 2023

Related U.S. Application Data

(63) Continuation of application No. 17/378,774, filed on Jul. 19, 2021, which is a continuation of application
(Continued)

(51) Int. Cl.
*G06F 15/173* (2006.01)
*H04L 1/00* (2006.01)
(Continued)

(52) U.S. Cl.
CPC .......... *H04L 1/0041* (2013.01); *H04L 1/004* (2013.01); *H04L 1/0045* (2013.01);
(Continued)

(58) Field of Classification Search
CPC ..... H04L 1/0041; H04L 1/004; H04L 1/0045; H04L 1/0057; H04L 41/22; H04L 41/5009; H04L 67/10; H04L 67/01; H04L 41/5003
(Continued)

(56) References Cited

U.S. PATENT DOCUMENTS

5,621,737 A * 4/1997 Bucher ................. H04W 52/04
714/704
5,825,361 A * 10/1998 Rubin .................... H04L 41/22
715/965
(Continued)

*Primary Examiner* — Kaylee J Huang
(74) *Attorney, Agent, or Firm* — Polsinelli P.C.

(57) ABSTRACT

Disclosed are systems, methods, and non-transitory computer-readable storage media for monitoring application health via correctable errors. The method includes identifying, by a network device, a network packet associated with an application and detecting an error associated with the network packet. In response to detecting the error, the network device increments a counter associated with the application, determines an application score based at least in part on the counter, and telemeters the application score to a controller. The controller can generate a graphical interface based at least in part on the application score and a timestamp associated with the application score, wherein the graphical interface depicts a trend in correctable errors experienced by the application over a network.

18 Claims, 8 Drawing Sheets

Related U.S. Application Data

No. 16/752,299, filed on Jan. 24, 2020, now Pat. No. 11,070,311, which is a continuation of application No. 15/198,085, filed on Jun. 30, 2016, now Pat. No. 10,547,412.

(51) Int. Cl.

| | | |
|---|---|---|
| *H04L 41/22* | (2022.01) | |
| *H04L 41/5009* | (2022.01) | |
| *H04L 67/10* | (2022.01) | |
| *H04L 41/5003* | (2022.01) | |

(52) U.S. Cl.
CPC ............ *H04L 1/0057* (2013.01); *H04L 41/22* (2013.01); *H04L 41/5009* (2013.01); *H04L 67/10* (2013.01); *H04L 41/5003* (2013.01)

(58) Field of Classification Search
USPC ........................................ 709/224, 223, 217
See application file for complete search history.

(56) References Cited

U.S. PATENT DOCUMENTS

| | | | |
|---|---|---|---|
| 6,035,007 A | | 3/2000 | Khayrallah et al. |
| 6,690,884 B1* | | 2/2004 | Kelty .................. H04B 10/695 714/704 |
| 8,095,635 B2 | | 1/2012 | Wang et al. |
| 8,144,706 B1 | | 3/2012 | Daniel et al. |
| 8,443,080 B2 | | 5/2013 | Ding et al. |
| 8,553,547 B2 | | 10/2013 | Ohana et al. |
| 9,230,213 B2 | | 1/2016 | Rash et al. |
| 2002/0194371 A1 | | 12/2002 | Kadoi |
| 2003/0223466 A1 | | 12/2003 | Noronha, Jr. et al. |
| 2004/0083299 A1 | | 4/2004 | Dietz et al. |
| 2004/0199830 A1* | | 10/2004 | Gilbert .................. G06F 11/106 714/47.2 |
| 2005/0264581 A1* | | 12/2005 | Patrick .................... H04L 67/34 345/594 |
| 2006/0047809 A1* | | 3/2006 | Slattery ................... H04L 43/02 709/224 |
| 2006/0200708 A1* | | 9/2006 | Gentieu .................. H04L 1/243 714/704 |
| 2006/0239300 A1 | | 10/2006 | Hannel et al. |
| 2007/0186228 A1 | | 8/2007 | Ramaswamy et al. |
| 2011/0225476 A1* | | 9/2011 | Thottan ................. H04L 1/0045 714/776 |
| 2011/0276951 A1* | | 11/2011 | Jain ....................... G06F 11/301 718/1 |
| 2012/0198346 A1* | | 8/2012 | Clemm ............... H04L 43/0817 715/736 |
| 2014/0280889 A1 | | 9/2014 | Nispel et al. |
| 2014/0280899 A1* | | 9/2014 | Brewster, Jr. ....... H04L 43/0817 709/224 |
| 2014/0304573 A1 | | 10/2014 | Dodson et al. |
| 2015/0089332 A1* | | 3/2015 | Chambers ............... G06F 11/10 714/807 |
| 2016/0026922 A1 | | 1/2016 | Vasseur et al. |
| 2016/0210255 A1 | | 7/2016 | Wicki et al. |
| 2016/0373354 A1 | | 12/2016 | Davis et al. |
| 2017/0339038 A1* | | 11/2017 | Everett ............... H04L 25/0222 |
| 2017/0364561 A1* | | 12/2017 | Wu ....................... G06F 16/2456 |
| 2017/0372332 A1* | | 12/2017 | Shachar ............. G06Q 30/0255 |

* cited by examiner

SYSTEM AND METHOD TO MEASURE AND SCORE APPLICATION HEALTH VIA CORRECTABLE ERRORS

CROSS-REFERENCE TO RELATED APPLICATIONS

This application is a continuation of U.S. application Ser. No. 17/378,774, filed on Jul. 19, 2021, which in turn, is a continuation of U.S. application Ser. No. 16/752,299, filed Jan. 24, 2020, now. U.S. Pat. No. 11,070,311, which is a continuation of U.S. application Ser. No. 15/198,085, filed Jun. 30, 2016, now U.S. Pat. No. 10,547,412, the contents of each are incorporated herein by reference in their entireties.

TECHNICAL FIELD

The present technology pertains to application health monitoring, and more specifically to application health monitoring by detecting correctable errors in an application's network traffic.

BACKGROUND

With the growth of cloud computing and multi-tenant architectures, visibility of application health, such as trends in errors experienced by the application over a network, has become an important feature to service providers and consumers alike. Past research in network health largely focused on the observation of uncorrectable errors experienced by applications, such as dropped packets, checksum errors, and parity errors. Armed with this observed data, network hardware can be designed with defensive techniques such as error-correcting code (ECC) and forward error correction (FEC) to prevent uncorrectable errors. Furthermore, network applications can be written to react and recover should an uncorrectable error occur. However, these solutions fail to capture, analyze and score correctable network errors to provide visibility of network-wide application health and alerts to applications and users before a catastrophic failure occurs.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The phrase "correctable error" as described herein is defined as an error that can be repaired through error correction and does not require retransmission of data. For instance, a single bit error in ECC protected logic is an example of a correctable error. The phrase "uncorrectable error" as described herein is defined as a fatal error that cannot be repaired through error correction and requires retransmission of data. Examples of uncorrectable errors include dropped packets, checksum errors, and parity errors.

Overview

Disclosed are systems, methods, and non-transitory computer-readable storage media for monitoring network-wide application health via correctable errors. The method includes identifying, by a network device, a network packet associated with an application and detecting an error associated with the network packet. In response to detecting the error, the network device increments a counter associated with the application, determines an application score based at least in part on the counter, and telemeters the application score to a controller. The controller can generate a graphical interface based at least in part on the application score and a timestamp associated with the application score, wherein the graphical interface depicts a trend in correctable errors experienced by the application over a network.

Description

The disclosed technology addresses the need in the art for monitoring application health over a network. Disclosed are systems, methods, and computer-readable storage media for capturing, analyzing and scoring correctable network errors to provide visibility of network-wide application health and alerts to applications and users before a catastrophic failure occurs. A brief introductory description of exemplary systems and networks, as illustrated in FIGS. 1 through 6, is disclosed herein. A detailed description of methods for monitoring application health, related concepts, and exemplary variations will then follow. These variations shall be described herein as the various embodiments are set forth. The disclosure now turns to FIG. 1.

Figure 1:
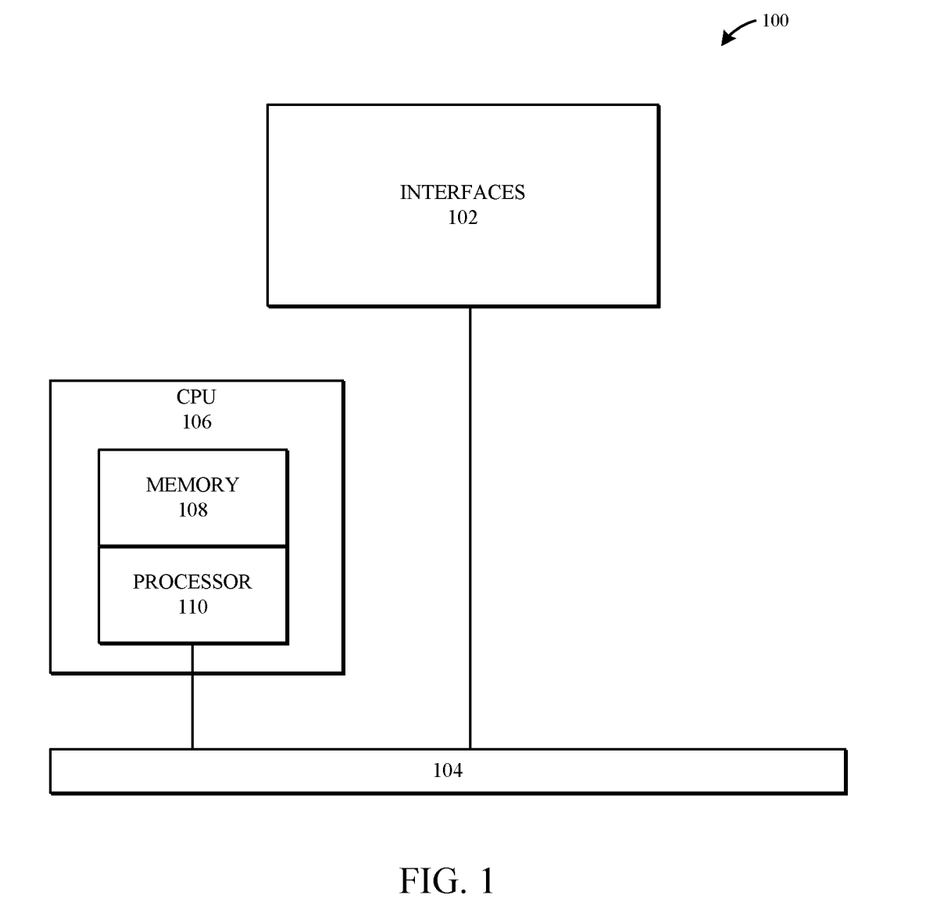
FIG. 1 illustrates an example network device according to some aspects of the subject technology.

FIG. 1 illustrates an exemplary network device 100 suitable for implementing the present invention. Network device 100 includes a master central processing unit (CPU) 106, interfaces 102, and a bus 104 (e.g., a PCI bus). When acting under the control of appropriate software or firmware, CPU 106 is responsible for executing packet management, error detection, and/or routing functions, such as miscabling detection functions, for example. CPU 106 preferably accomplishes all these functions under the control of software including an operating system and any appropriate applications software. CPU 106 may include one or more processors 110 such as a processor from the Motorola family of microprocessors or the MIPS family of microprocessors. In an alternative embodiment, processor 110 is specially designed hardware for controlling the operations of network device 100. In a specific embodiment, a memory 108 (such as non-volatile RAM and/or ROM) also forms part of CPU 106. However, there are many different ways in which memory could be coupled to the system.

Interfaces 102 are typically provided as interface cards (sometimes referred to as "line cards"). Generally, they control the sending and receiving of data packets over the network and sometimes support other peripherals used with network device 100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master CPU 106 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 108) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
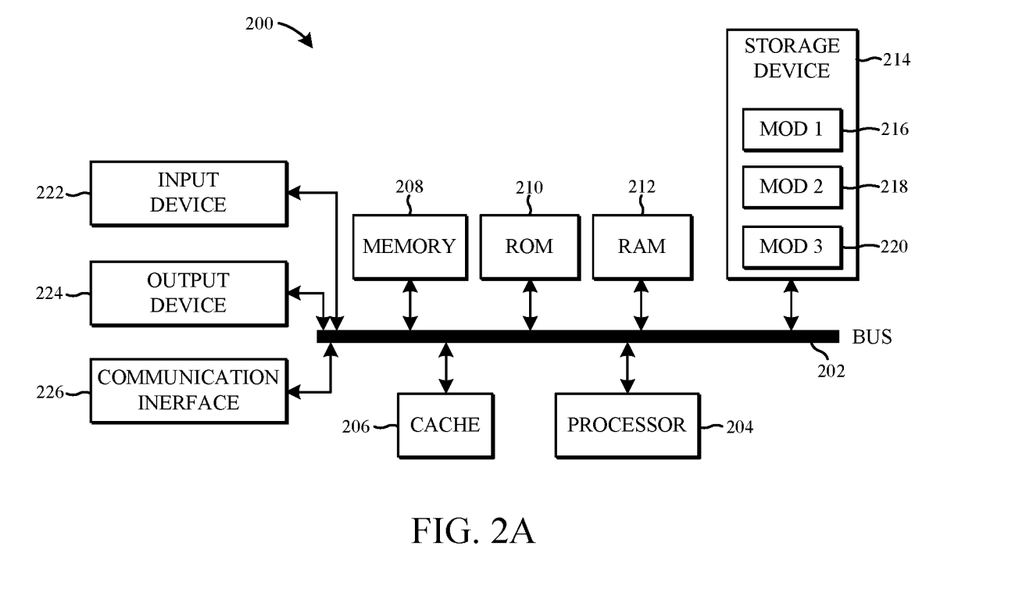
FIGS. 2A and 2B illustrate example system embodiments according to some aspects of the subject technology.
Figure 2B:
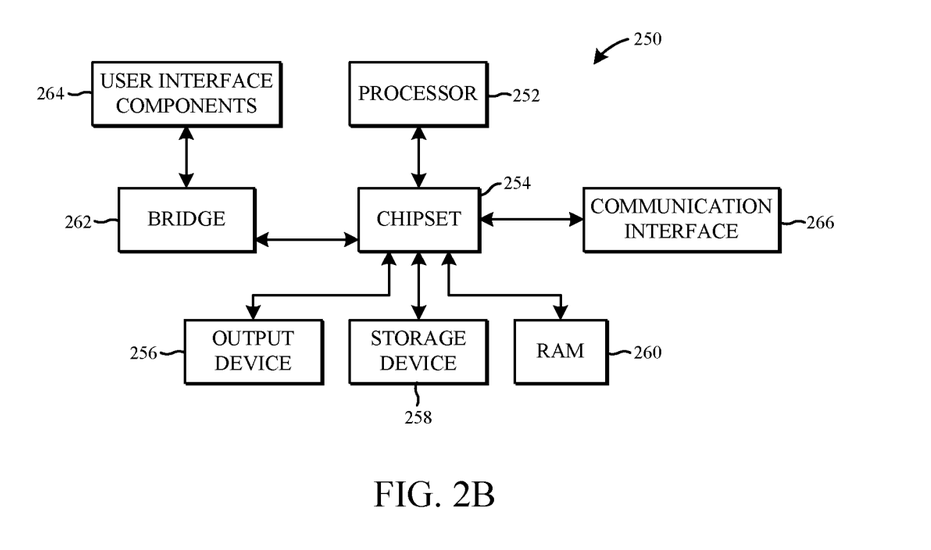

FIG. 2A and FIG. 2B illustrate exemplary computer system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 202. Exemplary system 200 includes a processing unit (CPU or processor) 204 and a system bus 202 that couples various system components including the system memory 208, such as read only memory (ROM) 210 and random access memory (RAM) 212, to the processor 204. The system 200 can include a cache of high-speed memory connected directly with, in close proximity to, or integrated as part of the processor 204. The system 200 can copy data from the memory 208 and/or the storage device 214 to the cache 206 for quick access by the processor 204. In this way, the cache can provide a performance boost that avoids processor 204 delays while waiting for data. These and other modules can control or be configured to control the processor 204 to perform various actions. Other system memory 208 may be available for use as well. The memory 208 can include multiple different types of memory with different performance characteristics. The processor 204 can include any general purpose processor and a hardware module or software module, such as module 1 216, module 2 218, and module 3 220 stored in storage device 214, configured to control the processor 204 as well as a special-purpose processor where software instructions are incorporated into the actual processor design. The processor 204 may essentially be a completely self-contained computing system, containing multiple cores or processors, a bus, memory controller, cache, etc. A multi-core processor may be symmetric or asymmetric.

To enable user interaction with the computing device 200, an input device 222 can represent any number of input mechanisms, such as a microphone for speech, a touch-sensitive screen for gesture or graphical input, keyboard, mouse, motion input, speech and so forth. An output device 224 can also be one or more of a number of output mechanisms, such as a display, known to those of skill in the art. In some instances, multimodal systems can enable a user to provide multiple types of input to communicate with the computing device 200. The communications interface 226 can generally govern and manage the user input and system output. There is no restriction on operating on any particular hardware arrangement and therefore the basic features here may easily be substituted for improved hardware or firmware arrangements as they are developed.

Storage device 214 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 212, read only memory (ROM) 210, and hybrids thereof.

The storage device 214 can include software modules 216, 218, 220 for controlling the processor 204. Other hardware or software modules are contemplated. The storage device 214 can be connected to the system bus 202. In one aspect, a hardware module that performs a particular function can include the software component stored in a computer-readable medium in connection with the necessary hardware components, such as the processor 204, bus 202, output device 224, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 252, representative of any number of physically and/or logically distinct resources capable of executing software, firmware, and hardware configured to perform identified computations. Processor 252 can communicate with a chipset 254 that can control input to and output from processor 252. In this example, chipset 254 outputs information to output 256, such as a display, and can read and write information to storage device 258, which can include magnetic media, and solid state media, for example. Chipset 254 can also read data from and write data to RAM 260. A bridge 262 for interfacing with a variety of user interface components 264 can be provided for interfacing with chipset 254. Such user interface components 264 can include a keyboard, a microphone, touch detection and processing circuitry, a pointing device, such as a mouse, and so on. In general, inputs to system 250 can come from any of a variety of sources, machine generated and/or human generated.

Chipset 254 can also interface with one or more communication interfaces 266 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 252 analyzing data stored in storage 258 or 260. Further, the machine can receive inputs from a user via user interface components 264 and execute appropriate functions, such as browsing functions by interpreting these inputs using processor 252.

It can be appreciated that exemplary systems 200 and 250 can have more than one processor 204 or be part of a group or cluster of computing devices networked together to provide greater processing capability.

Figure 3:
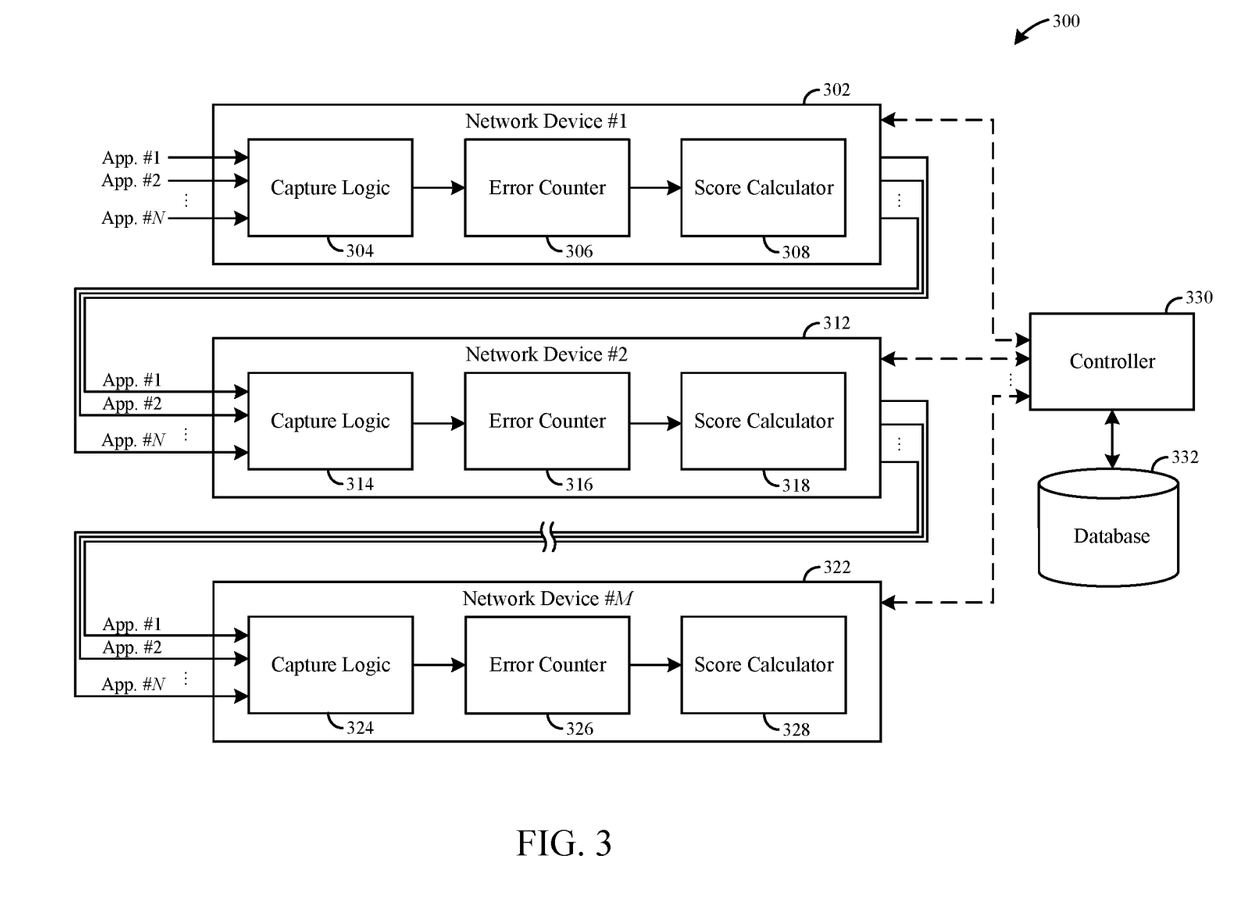
FIG. 3 illustrates an exemplary system for monitoring the health of applications over a network.

FIG. 3 illustrates an exemplary system 300 for monitoring the health of applications over a network. In particular, system 300 is configured to monitor the health of network applications by detecting and/or correcting correctable errors in an application's network traffic. It will be appreciated by those skilled in the art that system 300 may monitor application health via uncorrectable errors without departing from the scope and spirit of the present disclosure. As illustrated, system 300 can include one or more switches, hubs, routers, or the like, designated by network devices 302, 312, 322, for directing application traffic through a network. Each of network devices 302, 312, 322 can include one or more processors and/or storage devices, capture logic 304, 314, 324, an error counter 306, 316, 326, and a score calculator 308, 318, 328, respectively.

In operation, capture logic 304, 314, 324 can be configured to identify network traffic (e.g., network packets) corresponding to an application running on a computing node or other computing device. Such a configuration can be implemented through a policy provided by an application policy infrastructure controller (APIC) 330 in communication with each of network devices 302, 312, 322. The policy can be a global policy applied to all network devices 302, 312, 322 under the domain of controller 330, or can be multiple individualized policies applied to specific network devices 302, 312, 322. Moreover, the policy can be dynamically updated by controller 330 in response to changes in network application traffic and/or based on specific application requirements.

Once the network traffic corresponding to an application is identified, capture logic 304, 314, 324 can associate the network traffic of the application with a unique counter within error counters 306, 316, 326. The unique counter associated with an application can be incremented upon local detection of a correctable error in the application's network traffic. For example, capture logic 304 can be configured to identify network packets corresponding to Application #1, Application #2, . . . , Application #N, and can associate the network traffic of each of Application #1, Application #2, . . . , Application #N with a unique counter within error counter 306. When a correctable error in an application's traffic is detected within network device 302, the unique counter associated with the application can be incremented by error counter 306.

Utilizing the uniquely updated error counter from error counters 306, 316, 326, score calculators 308, 318, 328 can compute a score for each application. The score can provide a metric for monitoring and analyzing a trend of correctable errors experienced by an application's network traffic. In some cases, the score can be based at least in part on the instantaneous, average, minimum, maximum, and/or standard deviation of the correctable error count for an application.

Figure 4A:
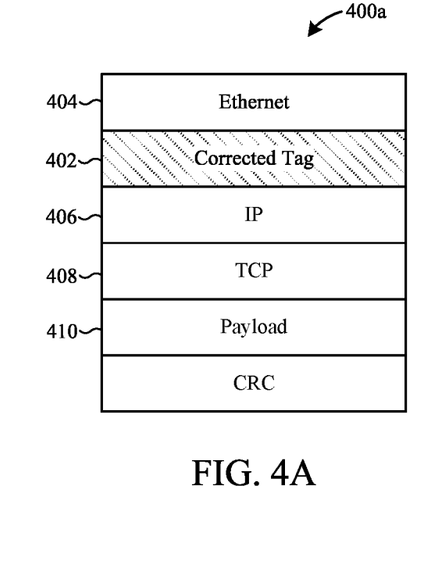
FIGS. 4A, 4B, and 4C illustrate exemplary locations of a corrected tag within a network packet.
Figure 4B:
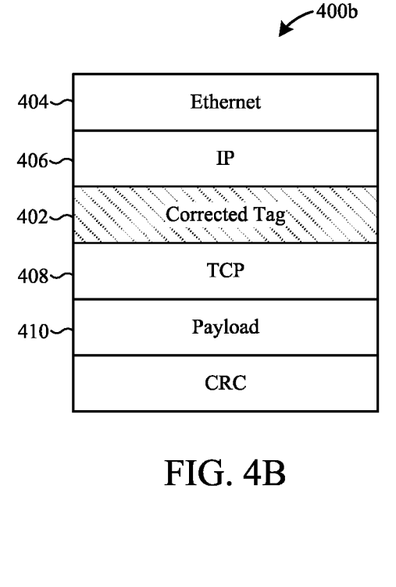
Figure 4C:
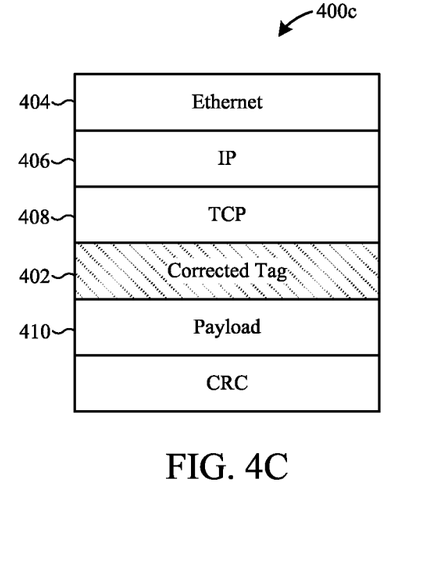

After computing the score for each application, network devices 302, 312, 322 can encode an application's correctable error count and/or score along with a timestamp into packets associated with the application as the packets traverse from their source (e.g., an application server) to their destination (e.g., a user computing device) through system 300. Such an encoding can be achieved, for example, by inserting a corrected tag having fields for the correctable error count, score, timestamp, and/or other information (e.g., switch ID, Ethernet type) into the appropriate application's network packets via network devices 302, 312, 322. As illustrated in FIGS. 4A-C, the corrected tag can be inserted at various locations within an individual network packet 400a, 400b, or 400c, respectively. For instance, a corrected tag 402 can be inserted between an Ethernet frame 404 and an IP packet 406 (FIG. 4A), between IP packet 406 and a TCP segment 408 (FIG. 4B), or between TCP segment 408 and a payload 410 (FIG. 4C).

Once the corrected tag is inserted into an application's network packet, network devices 302, 312, 322 can telemeter the corrected tag along with the packet to controller 330 using any network telemetry technique known in the art. In this manner, controller 330 can determine the correctable error count, score, timestamp, and/or other information associated with the application. In some cases, each of network devices 302, 312, 322 traversed by an application's network traffic can telemeter the corrected tag to controller 330 with each network packet or at predefined intervals. In other cases, only the final network device traversed by an application's network traffic can telemeter the corrected tag along with the packet to controller 300. To do so, the network packet having the corrected tag can be directed from an initial network device, such as network device 302, to an intermediate network device, such as network device 312, in accordance with the packet's network path. The intermediate network device can decode at least a portion of the incoming network packet to obtain the corrected tag and can use the data within the corrected tag to compute a new correctable error count and/or score. The intermediate device can then update the corrected tag with the new correctable error count and/or score (along with a new timestamp and/or other information) and can encode the updated corrected tag within the network packet. From here, the network packet having the updated corrected tag can be directed to another intermediate network device and the aforementioned process can be repeated. Once the network packet arrives at the final network device in its network path, such as network device 322, the final network device can telemeter the corrected tag along with the packet to controller 330.

Figure 5A:
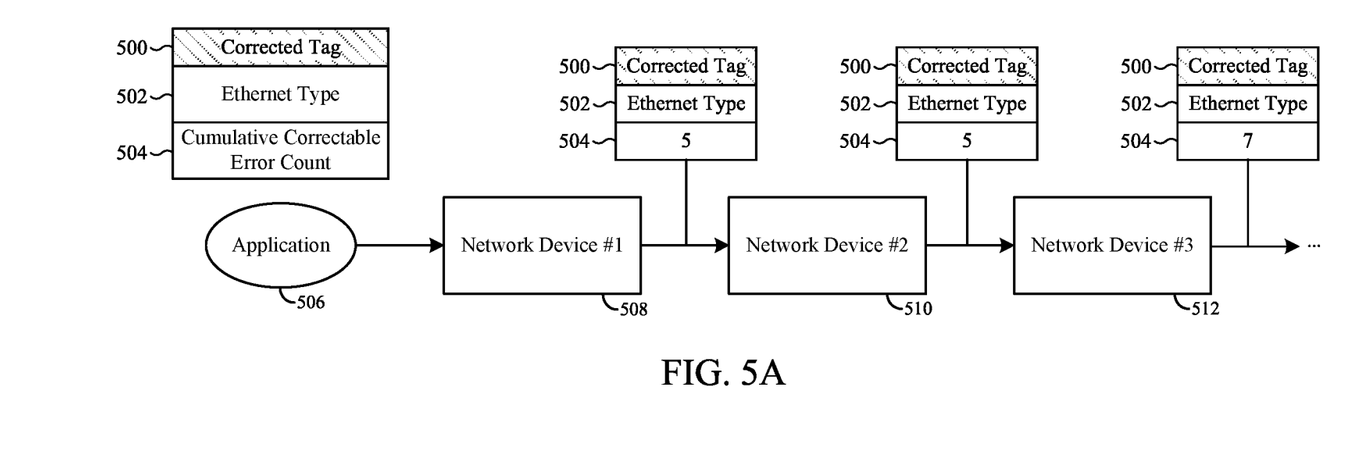
FIGS. 5A and 5B illustrate exemplary embodiments of a corrected tag.
Figure 5B:
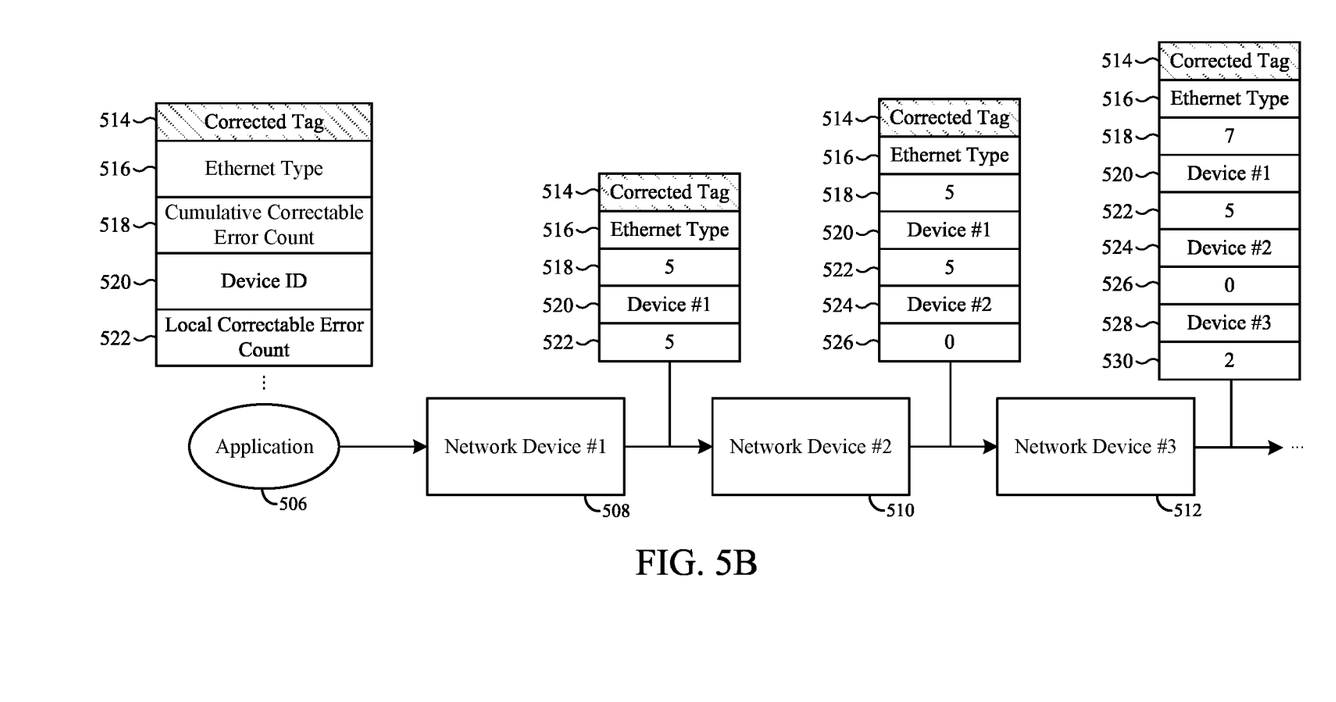

Having disclosed some basic concepts of the corrected tag and its role in holding the correctable error count, score, timestamp, and/or other information for a networked application, the disclosure now turns to FIGS. 5A and 5B which illustrate exemplary embodiments of the corrected tag in accordance with the present disclosure. FIGS. 5A and 5B are provided for example purposes only, and it will be appreciated by those skilled in the art that the disclosed corrected tags can be readily modified to include additional or alternate information.

Referring to FIG. 5A, a corrected tag 500 can include an Ethernet type field 502 and a cumulative correctable error count field 504. Ethernet type field 502 can indicate a size and/or a protocol of corrected tag 500, and cumulative correctable error count field 504 can contain a network-wide correctable error count for a specific application, such as application 506. In some cases, field 504 can include an application score in place of or in addition to the correctable error count.

In operation, application 506 can transmit data in the form of network packets to a first network device 508. Upon receipt of a network packet, network device 508 can detect and/or correct correctable errors in the network packet and can increment a unique counter associated with application 506 as previously discussed.

Prior to transmitting the network packet to a second network device 510, network device 508 can update cumulative correctable error count field 504 with the application score and/or correctable error count from the unique counter and can encode the network packet with corrected tag 500. For instance, in the example of FIG. 5A, network device 508 detected and/or corrected five correctable errors and updated field 504 of corrected tag 500 accordingly. This same process can be repeated for subsequent network devices, such as network devices 510, 512. For example, as illustrated in FIG. 5A, network device 510 did not detect or correct any correctable errors, and thus field 504 of corrected tag 500 remained at five. On the other hand, network device 512 detected and/or corrected two correctable errors and updated field 504 of corrected tag 500 to indicate that a total of seven correctable errors occurred in the traffic of application 506.

FIG. 5B illustrates another exemplary embodiment of a corrected tag 514 having an Ethernet type field 516, a cumulative correctable error count field 518, and at least one device ID field 520 and one local correctable error count field 522. Much like corrected tag 500, Ethernet type field 516 can indicate a size and/or a protocol of corrected tag 514, and cumulative correctable error count field 518 can contain a network-wide correctable error count and/or score for a specific application, such as application 506. Device ID field 520 can contain a unique ID associated with a network device, and local correctable error count 522 can hold a correctable error count and/or score for a specific application detected locally within the network device associated with device ID field 520. In some cases, field 520 can include a global time, an application ID, a custom defined ID, or any combination thereof in place of or in addition to the device ID.

Upon receipt of a network packet from application 506, network device 508 can detect and/or correct correctable errors in the network packet and can increment a unique counter associated with application 506 as previously discussed. Prior to transmitting the network packet to network device 510, network device 508 can update cumulative correctable error count field 518 with the correctable error count from the unique counter. Network device 508 can also insert its device ID, a global time (e.g., a timestamp), an application ID, a custom defined ID, or any combination thereof into device ID field 520, update local correctable error count field 522 with the local correctable error count and/or score, and encode the network packet with corrected tag 514. For instance, in the example of FIG. 5B, network device 508 detected and/or corrected five correctable errors and updated fields 518, 520, and 522 of corrected tag 514 accordingly. This same process can be repeated for subsequent network devices, such as network devices 510, 512. For example, as illustrated in FIG. 5B, network device 510 did not detect or correct any correctable errors, and thus cumulative correctable error field 518 of corrected tag 514 remained at five while a second device ID field 524 and a second local correctable error count field 526 with a value of zero were appended to corrected tag 514. On the other hand, network device 512 detected and/or corrected two correctable errors. Accordingly, network device 512 appended a third device ID field 528 and a third local correctable error count field 530 with a value of two, and updated field 518 of corrected tag 514 to indicate that a total of seven correctable errors occurred in the traffic of application 506.

Once the network packet reaches a final network device (e.g., the network device before its final destination), the corrected tag (e.g., corrected tag 500, 514) can be telemetered along with the packet to a controller, such as APIC 330 in FIG. 3. The network packet and the corrected tag can also be telemetered or otherwise directed to its source (i.e., application 506) so that the source can read, learn, react, and/or adapt to the data provided in the corrected tag. Moreover, the network packet and corrected tag can be telemetered or otherwise directed to a standalone application configured to monitor and interpret the corrected tag independently from the controller. In this manner, the controller, source, and/or standalone application can determine network device specific and/or network-wide correctable error information for an application.

Referring back to FIG. 3, as controller 330 receives the corrected tags from network devices 302, 312, 322, it can create a database 332 of corrected tag data (e.g., correctable error counts, scores, and/or other information along with a corresponding timestamp) for each application in the network. Similarly, the application source and/or a standalone application configured to monitor and interpret the corrected tags can each create its own database separate from database 332 with the corrected tag data for each application. In this manner, database 332, as well as the database(s) maintained by the application source and/or standalone application, can store network device specific and/or network-wide correctable error information and time of occurrence for each application.

Figure 6A:
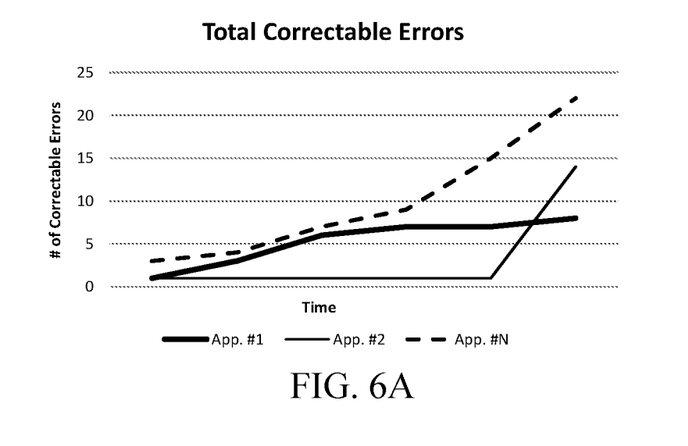
FIGS. 6A, 6B, and 6C illustrate exemplary graphical interfaces of trends in correctable errors experienced by applications in a network.
Figure 6B:
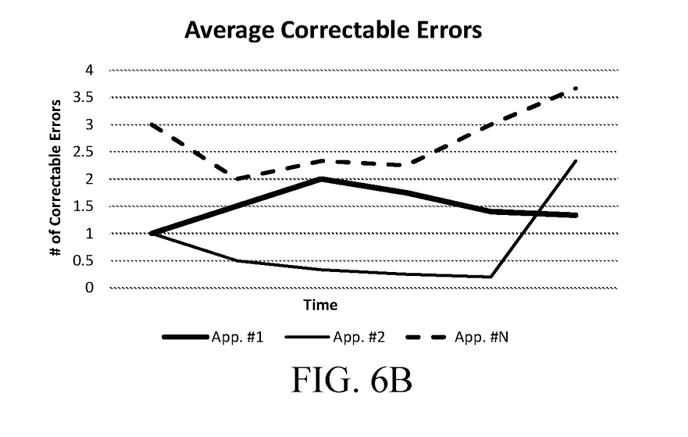
Figure 6C:
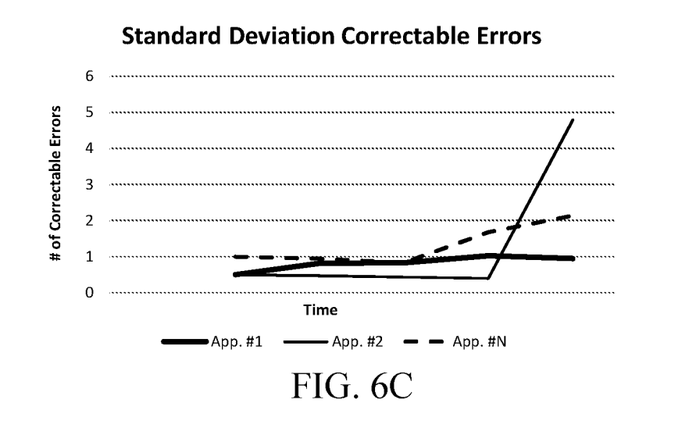

The information stored in any of the aforementioned databases can be used to provide a graphical interface of the trends in the correctable errors experienced by an application over a network, such as the graphical histograms depicting total, average, and standard deviation of correctable errors over time in FIGS. 6A-C. The graphical interfaces generated based on the information in database 332, the application server database, and/or the standalone application database can be network device specific or network-wide interfaces and can utilize multivariate models, such as Monte Carlo models, to provide further analysis and correlation. In doing so, controller 330 can provide visibility of application health to an application and/or a user.

Moreover, controller 330, the application source, and/or the standalone application can monitor and analyze trends in correctable errors experienced by an application to automatically identify problematic routes and/or network devices. Based on this monitoring and analysis, controller 330, the application source, and/or the standalone application can predict the health of the application's network path. Controller 330, the application source, and/or the standalone application can also generate alerts to applications and/or users to notify the applications and/or users of the health of the application's network path, to warn the applications and/or users before a catastrophic (e.g., uncorrectable) error occurs, and/or to indicate metrics pertaining to Service Level Agreements, such as best effort, basic, premium, and the like.

Figure 7:
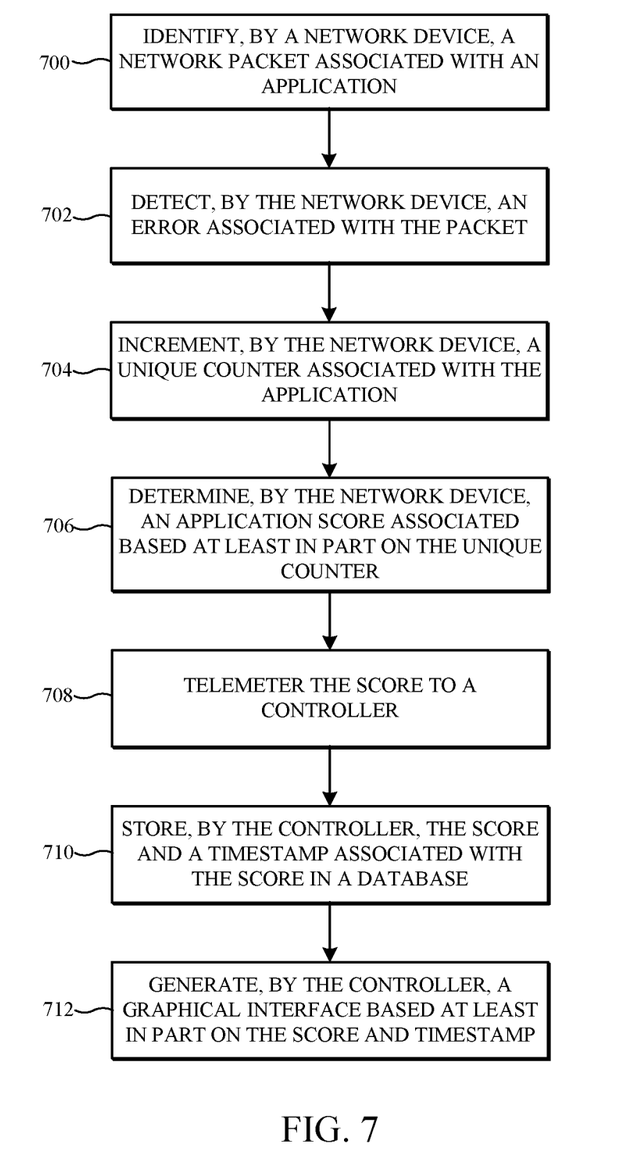
FIG. 7 illustrates an example method embodiment.

Having disclosed some basic system components and concepts, the disclosure now turns to the exemplary method embodiment shown in FIG. 7. For the sake of clarity, the method is described in terms of a system 300, as shown in FIG. 3, configured to practice the method. The steps outlined herein are exemplary and can be implemented in any combination thereof, including combinations that exclude, add, or modify certain steps.

Referring to FIG. 7, as network traffic from an application running on a computing node is received by a network device, such as network devices 302, 312, 322, the network device can identify and capture network packets corresponding to the application and can associate the packets with a unique counter (step 700). Such a process can be carried out by dedicated capture logic, such as capture logic 304, 314, 324, governed by a policy implemented by a controller (e.g., controller 330).

Once the application's packets are identified, the network device can utilize capture logic or other hardware and/or software to detect the occurrence of a local correctable error associated with the packets (step 702). In response to the detection of a correctable error, the network device can increment the unique counter associated with the application, for example, by utilizing an error counter 306, 316, 326 (step 704).

At step 706, the network device can calculate an application score based at least in part on the correctable error count held in the unique counter for the application. The score can provide a metric for monitoring and analyzing a trend of correctable errors experienced by the application's network traffic. Once the score has been calculated, the network device can telemeter the correctable error count and/or the score to a controller, such as controller 330 in system 300, along with a timestamp and other information associated with the correctable error count and/or score (step 708). In some cases, the network device can also transmit the score, the correctable error count, the timestamp, and/or other information back to the application's source to allow the application to read, learn, react, and/or adapt to trends in its network traffic, or to a standalone application configured to monitor and interpret the correctable error information. Moreover, in some cases, the network device can encode the score, the correctable error count, the timestamp, and/or other information as a corrected tag within packets associated with the application's network traffic. The packets having the corrected tag can be passed on to intermediate network devices, and only the final network device in the application's network traffic flow can telemeter the corrected tag to the controller. Further, in some cases, the network device can telemeter the correctable error count and an associated timestamp to the controller, application source, and/or standalone application where the application score can be calculated locally.

At step 710, the controller can store the received correctable error count, score, timestamp, and/or other information within a database 332. Similarly, the application source and/or standalone application can store the received correctable error information in their own respective database separate from database 332. The controller, application source, or standalone application can generate a graphical interface based at least in part on the received correctable error count, score, timestamp, and/or other information (step 712). The graphical interface can provide a network-wide or network device specific visual indication of the application's network health as well as trends in the correctable errors and/or score experienced by the application over the network. The controller, application source, or standalone application can monitor and analyze the trends in the application's score and/or correctable error count to predict the health of the application's network path. The controller, application source, or standalone application can also provide alerts to applications and/or users to notify the applications and/or users of the health of the application's network path, to warn the applications and/or users before an uncorrectable error occurs, and/or to indicate metrics pertaining to Service Level Agreements, such as best effort, basic, premium, and the like.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:
    receiving, by a first network device in a network, network traffic traversing the network from at least one source in the network;
    correcting a plurality of correctable errors associated with the network traffic;
    incrementing one or more counters counting each corrected error of the plurality of correctable errors associated with the network traffic;
    transmitting telemetry information associated with the one or more counters to a network controller associated with the network;
    transmitting the network traffic to a second network device in the network;
    monitoring at least one trend in the correctable errors corrected in the network traffic; and
    based at least in part on the at least one monitored trend, providing an alert with respect to a network path for an application that is the at least one source of the network traffic.

2. The method of claim 1, wherein the alert pertains to metrics associated with a service level agreement.

3. The method of claim 1, wherein the first network device is a switch.

4. The method of claim 1, wherein the correctable errors are repairable without retransmission of the network traffic.

5. The method of claim 1, wherein data associated with the at least one trend is displayed for a selected time period.

6. The method of claim 1, wherein data associated with the at least one trend is displayed as a histogram.

7. A system for monitoring a network, the system comprising:
    a plurality of network devices in the network; and
    a network controller associated with the plurality of network devices, wherein the network controller and the network devices are configured to:
        receive, by one network device of the plurality of network devices, network traffic traversing the network from at least one source in the network;
        correct a plurality of correctable errors associated with the network traffic;
        increment one or more counters counting each corrected error of the plurality of correctable errors associated with the network traffic;
        transmit telemetry information associated with the one or more counters to the network controller;
        transmit the network traffic to a second network device of the plurality of network devices;
        monitor at least one trend in the correctable errors corrected in the network traffic; and
        based at least in part on the at least one monitored trend, provide an alert with respect to a network path for an application that is the at least one source of the network traffic.

8. The system of claim 7, wherein the alert pertains to metrics associated with a service level agreement.

9. The system of claim 7 wherein the plurality of network devices include a switch.

10. The system of claim 7, wherein the correctable errors are repairable without retransmission of the network traffic.

11. The system of claim 7, wherein data associated with the at least one trend is displayed for a selected time period.

12. The system of claim 7, wherein data associated with the at least one trend is displayed as a histogram.

13. One or more non-transitory computer-readable media, including instructions which when executed at one or more network devices by one or more processors, cause the devices to:
    receive, by a first network device in a network, network traffic traversing the network from at least one source in the network;
    correct a plurality of correctable errors associated with the network traffic;
    increment one or more counters counting each corrected error of the plurality of correctable errors associated with the network traffic;
    transmit telemetry information associated with the one or more counters to a network controller associated with the network;
    transmit the network traffic to a second network device in the network;
    monitor at least one trend in the correctable errors corrected in the network traffic; and
    based at least in part on the at least one monitored trend, provide an alert with respect to a network path for an application that is the at least one source of the network traffic.

14. The one or more non-transitory computer-readable media of claim 13, wherein the alert pertains to metrics associated with a service level agreement.

15. The one or more non-transitory computer-readable media of claim 13, wherein the first network device is a switch.

16. The one or more non-transitory computer-readable media of claim 13, wherein the correctable errors are repairable without retransmission of the network traffic.

17. The one or more non-transitory computer-readable media of claim 13, wherein data associated with the at least one trend is displayed for a selected time period.

18. The one or more non-transitory computer-readable media of claim 13, wherein data associated with the at least one trend is displayed as a histogram.

* * * * *